United States Patent [19]

Wolf et al.

[11] Patent Number: 4,876,105
[45] Date of Patent: Oct. 24, 1989

[54] GELLAN GUM/GELATIN BLENDS

[75] Inventors: Carol L. Wolf, Solana Beach; William M. LaVelle; Ross C. Clark, both of San Diego, all of Calif.

[73] Assignee: Merck & Co., Inc., Rahway, N.J.

[21] Appl. No.: 204,449

[22] Filed: Jun. 9, 1988

[51] Int. Cl.⁴ .......................... A23L 1/06; A23L 1/04
[52] U.S. Cl. ..................................... 426/573; 426/576
[58] Field of Search ....................... 426/576, 573, 575; 252/315.01, 315.1, 315.3

[56] References Cited

U.S. PATENT DOCUMENTS 4,517,216 5/1985 Shim .................................... 426/573
4,546,002 10/1985 Leshik et al. ....................... 426/576

Primary Examiner—Jeanette Hunter
Attorney, Agent, or Firm—Gabriel Lopez; Hesna J. Pfeiffer

[57] ABSTRACT

Gellan gum/gelatin blends are disclosed which provide gels with improved setting and melting properties and improved room temperature stability relative to gels prepared using gelatin alone.

7 Claims, 16 Drawing Sheets

GELLAN GUM/GELATIN BLENDS

BACKGROUND OF THE INVENTION

Combinations of gellan gum with gelatin have been described. For example, U.S. Pat. No. 4,517,216 (Shim) describes blends in the with ratios of 5:1 to 1:5 which exhibit a synergistic increase in gel strength. Coacervates of gellan gum and gelatin are described in Chilvers et al., Carbohydrate Polymers 1 (2), 1987 and in the Kelco bulletin, "Gellan Gum in Microencapsulation", CD-31 (1983).

DETAILED DESCRIPTION OF THE INVENTION

Figure 1:
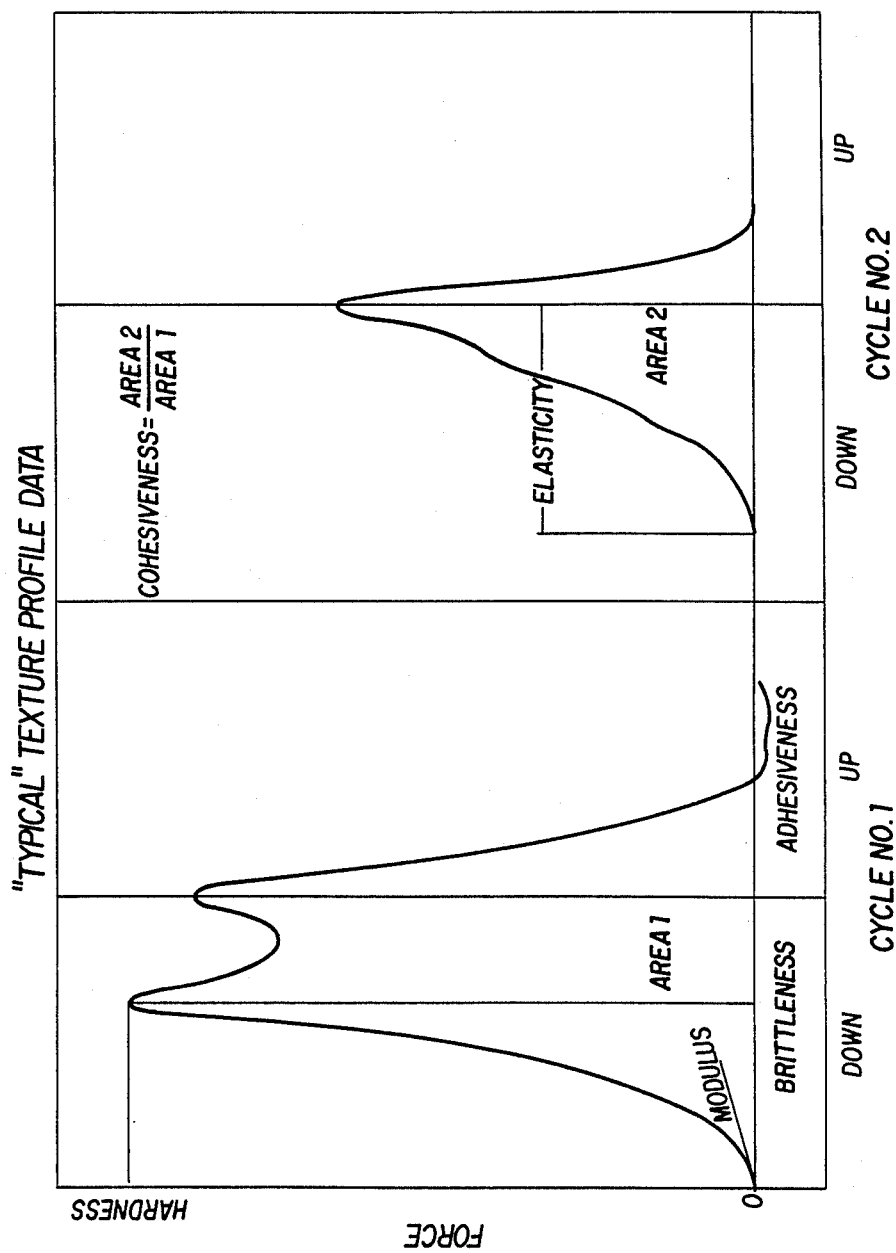
Figure 2:
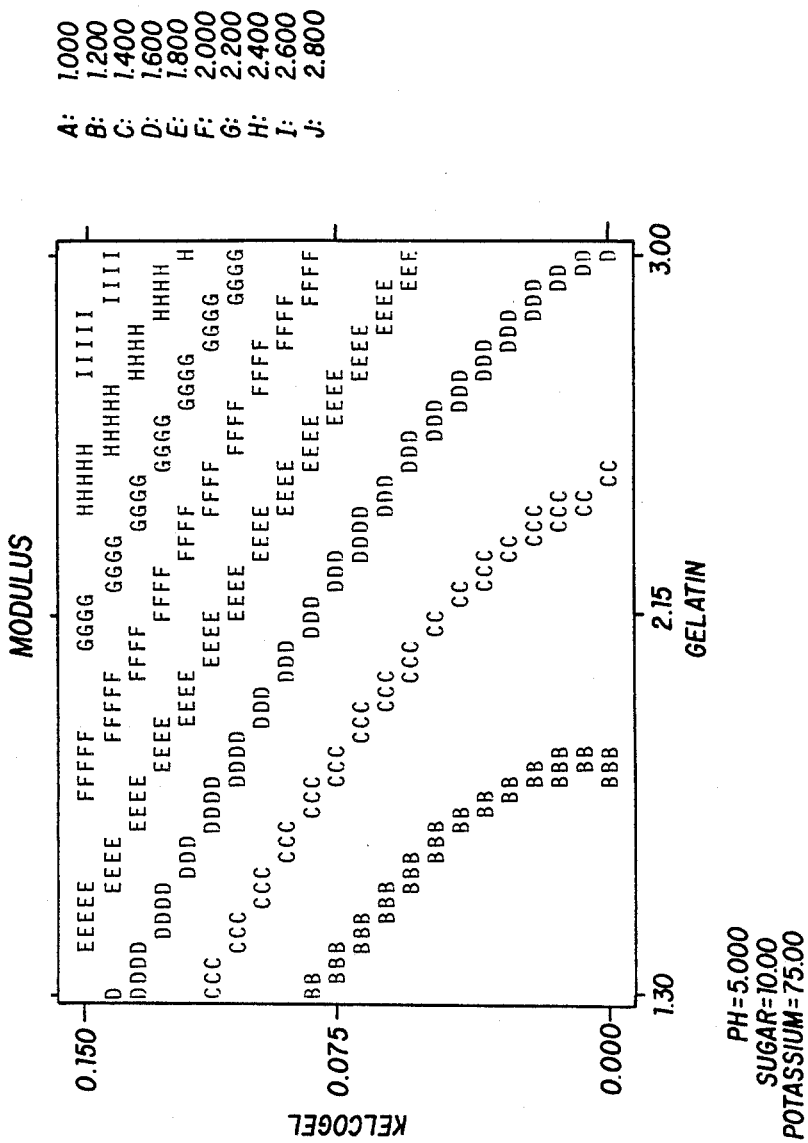
Figure 3:
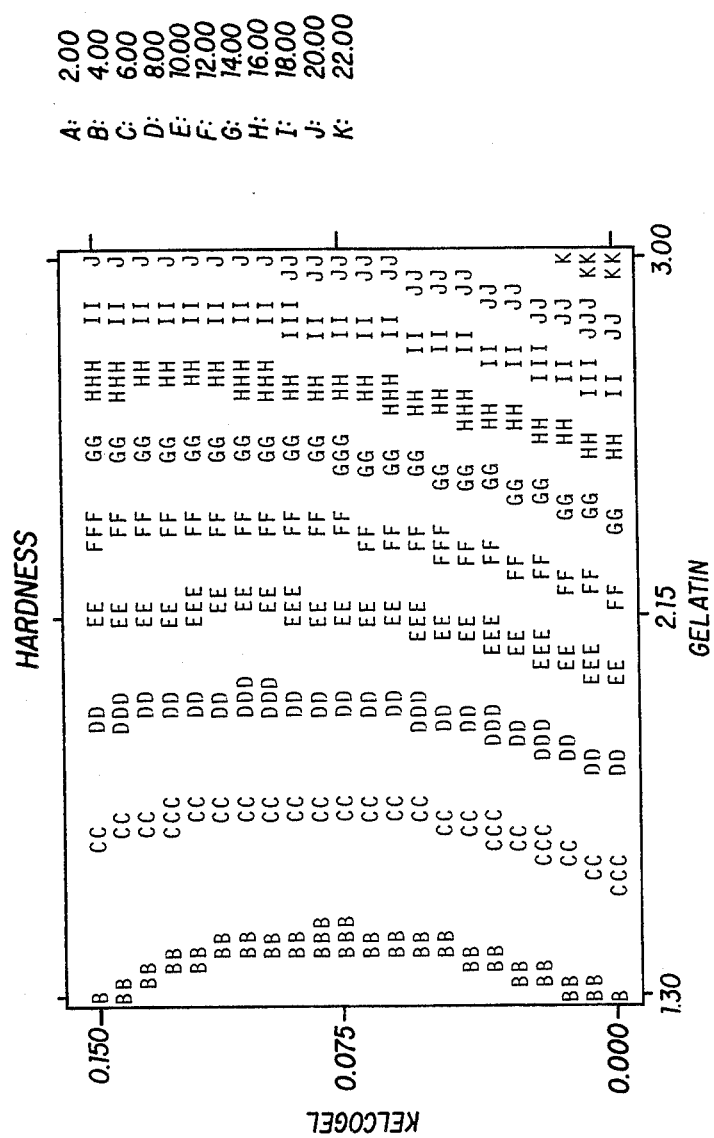
Figure 4:
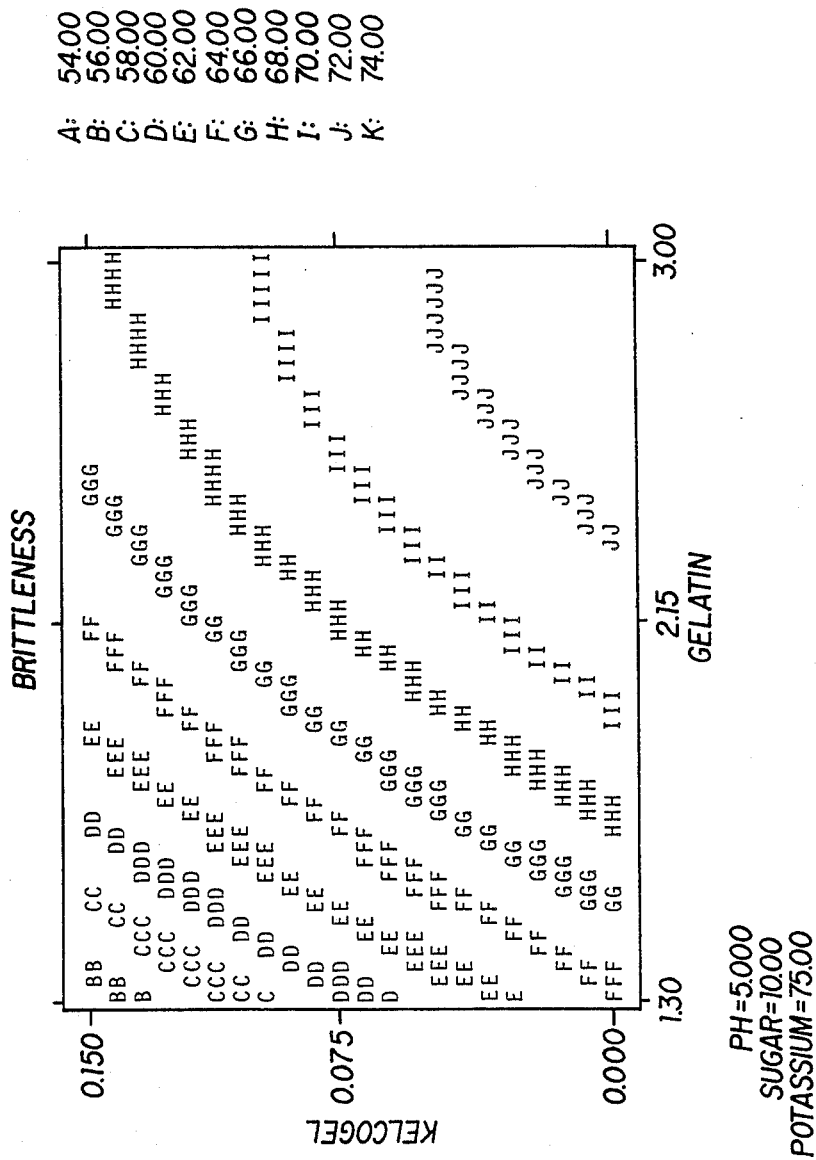
Figure 5:
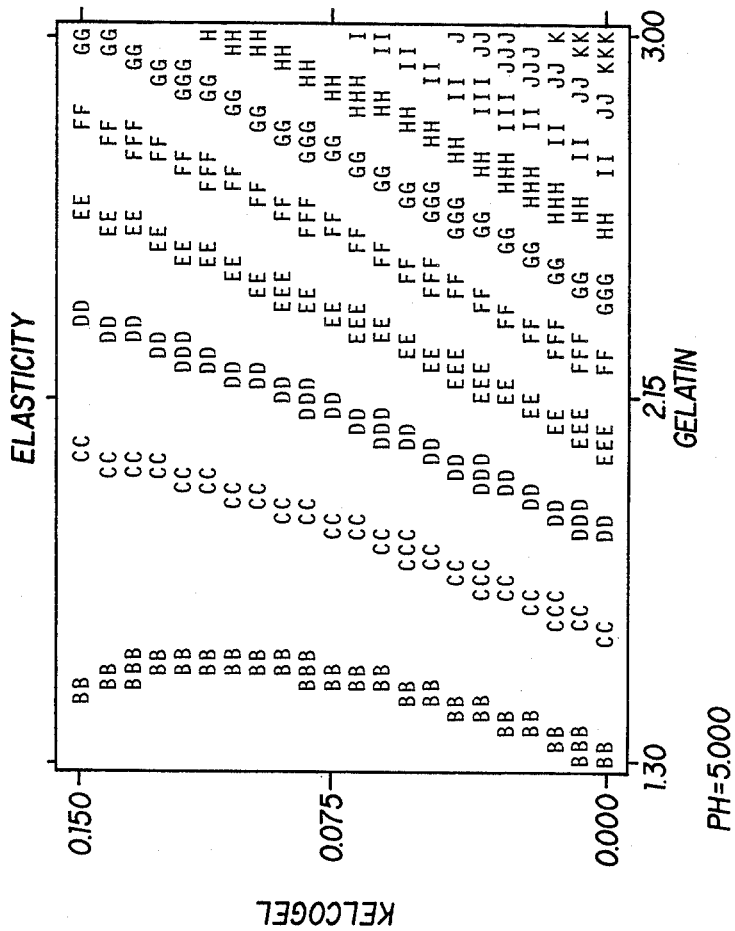
Figure 6:
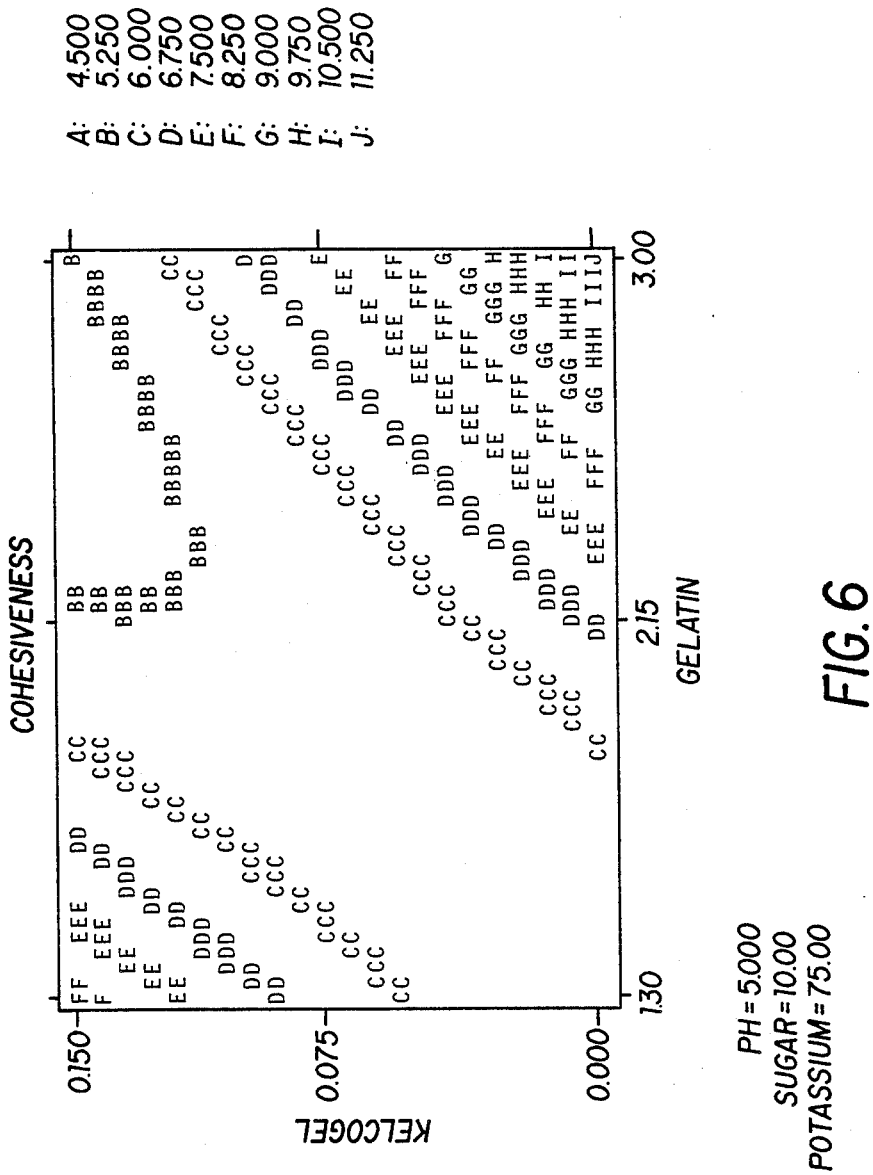
Figure 7:
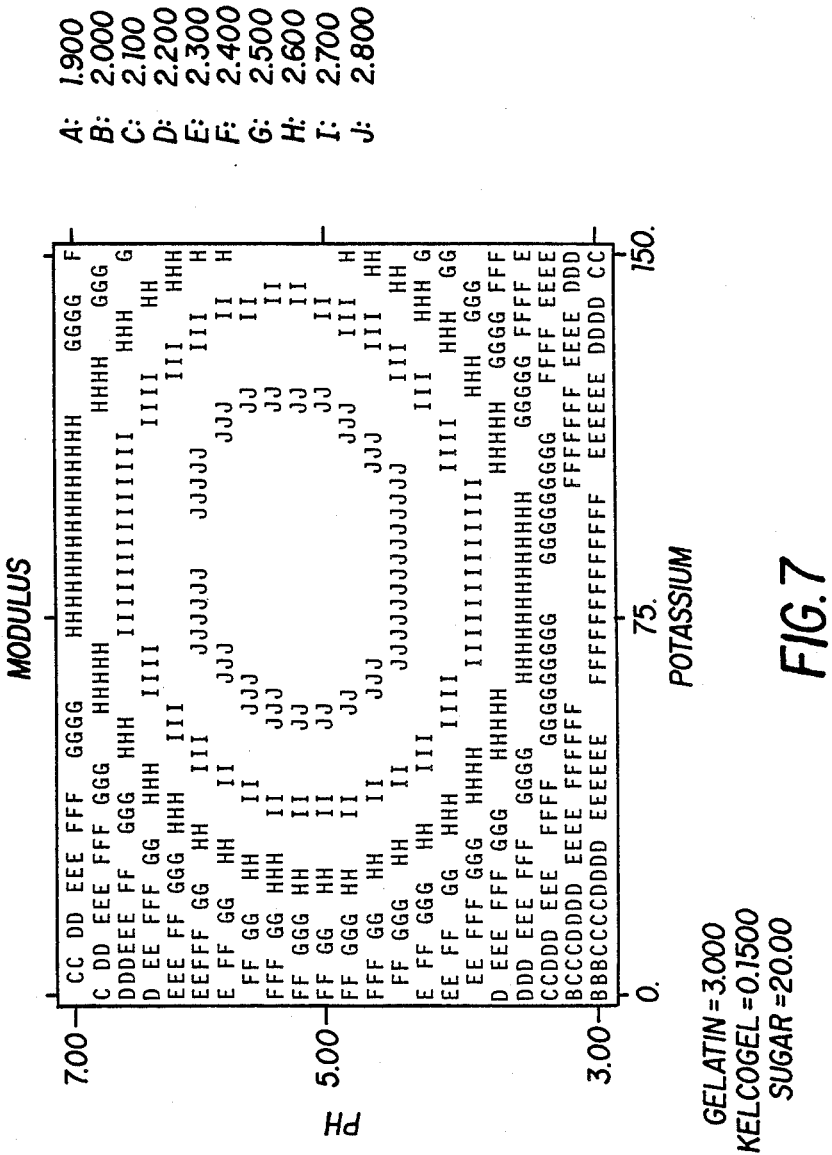
Figure 8:
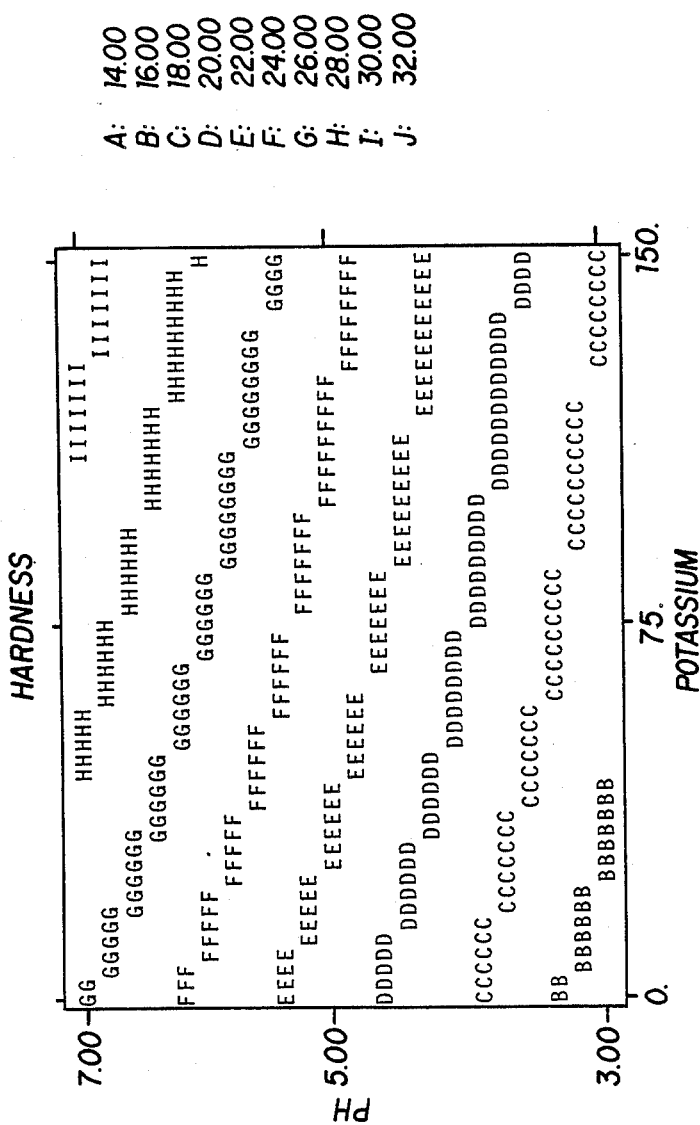
Figure 9:
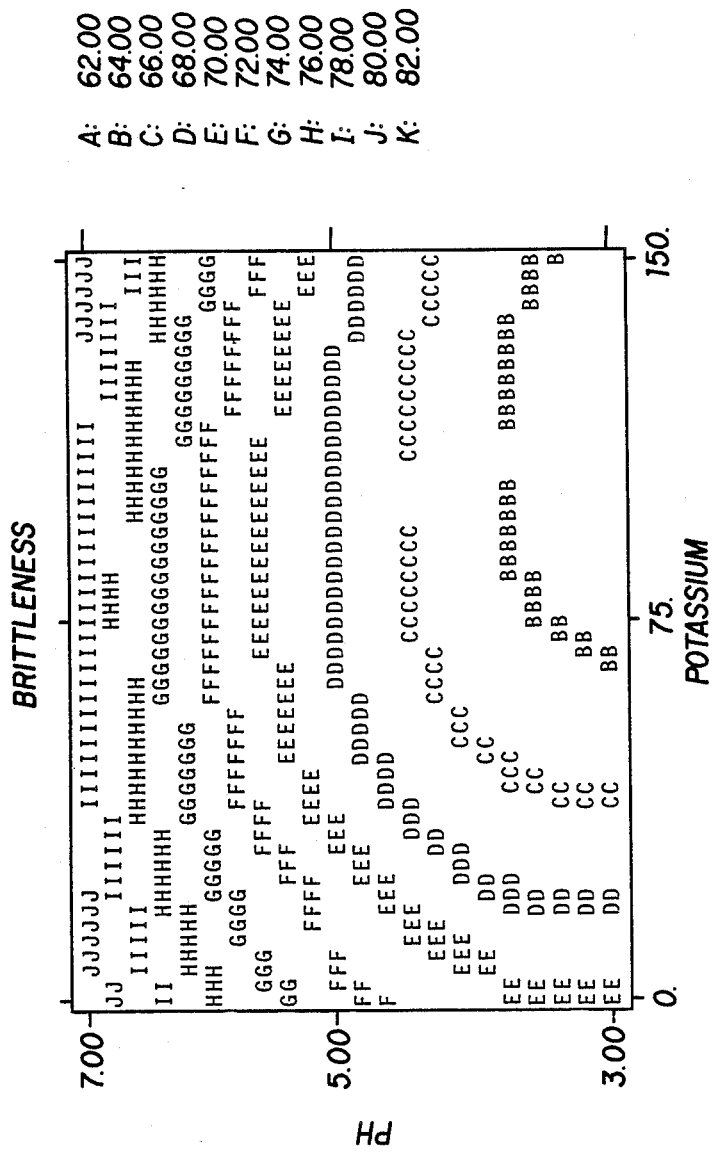
Figure 10:
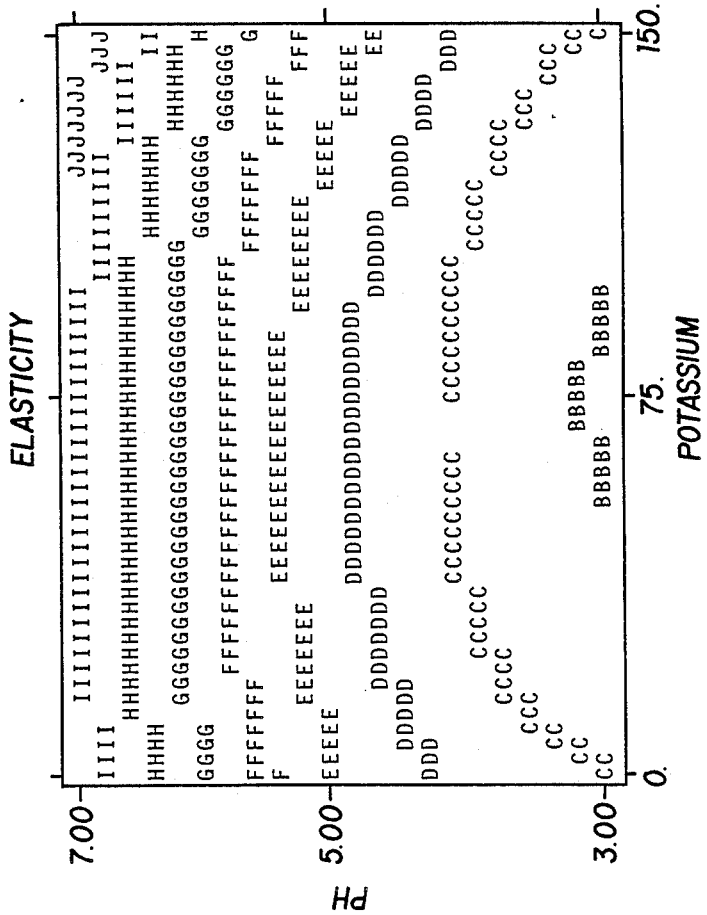
Figure 11:
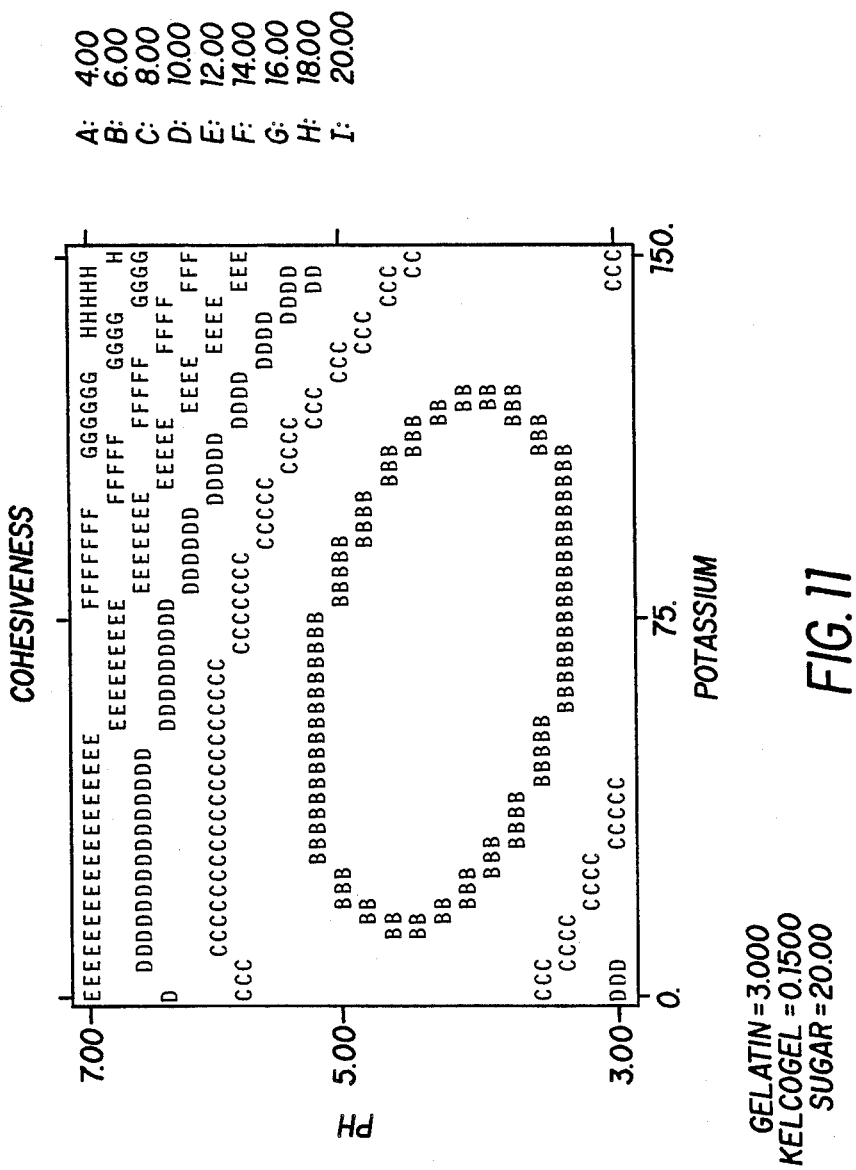
Figure 12:
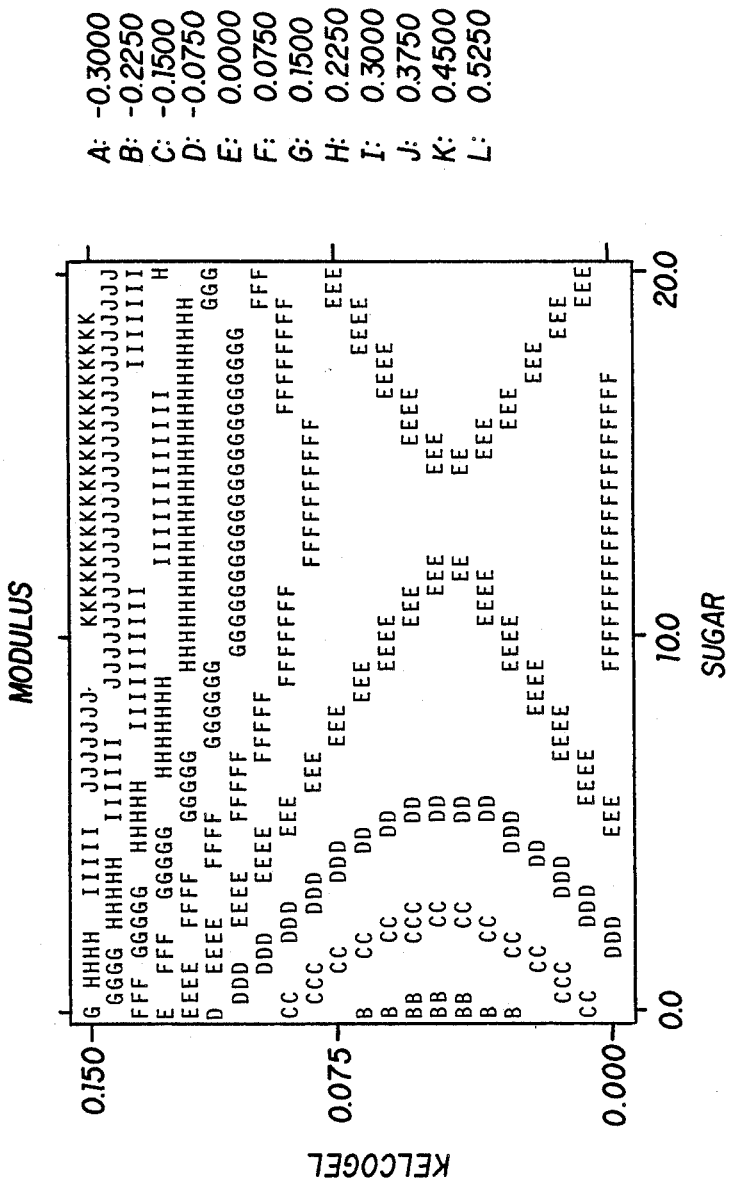
Figure 13:
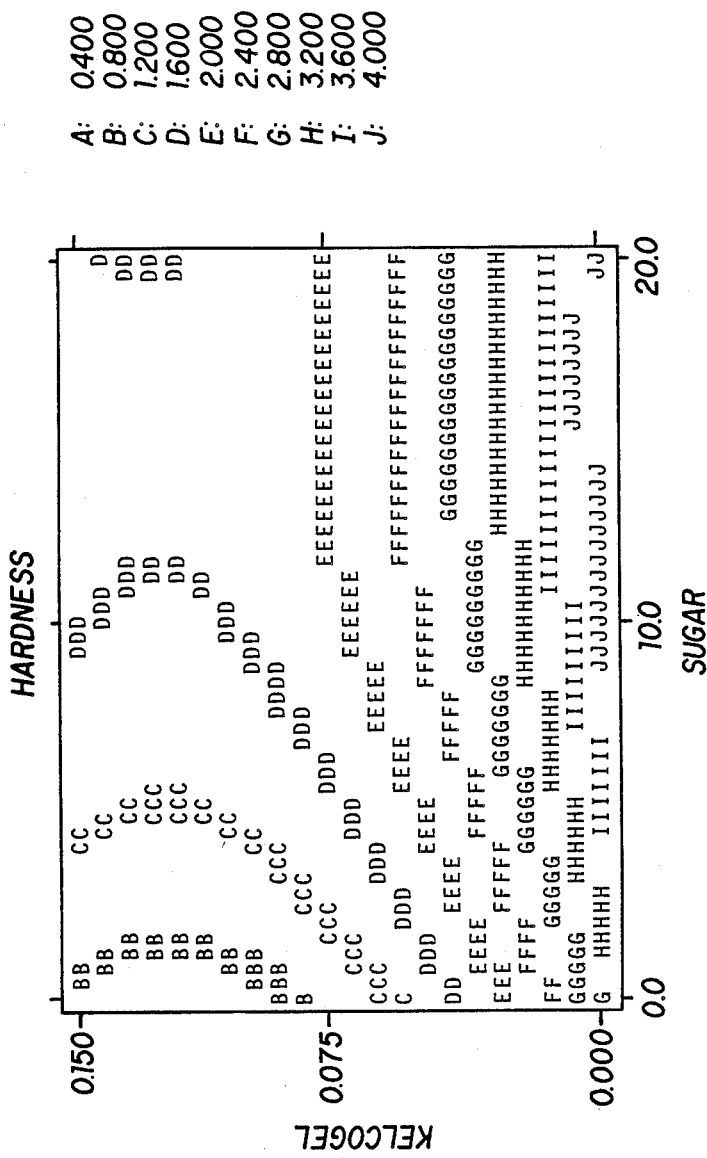
Figure 14:
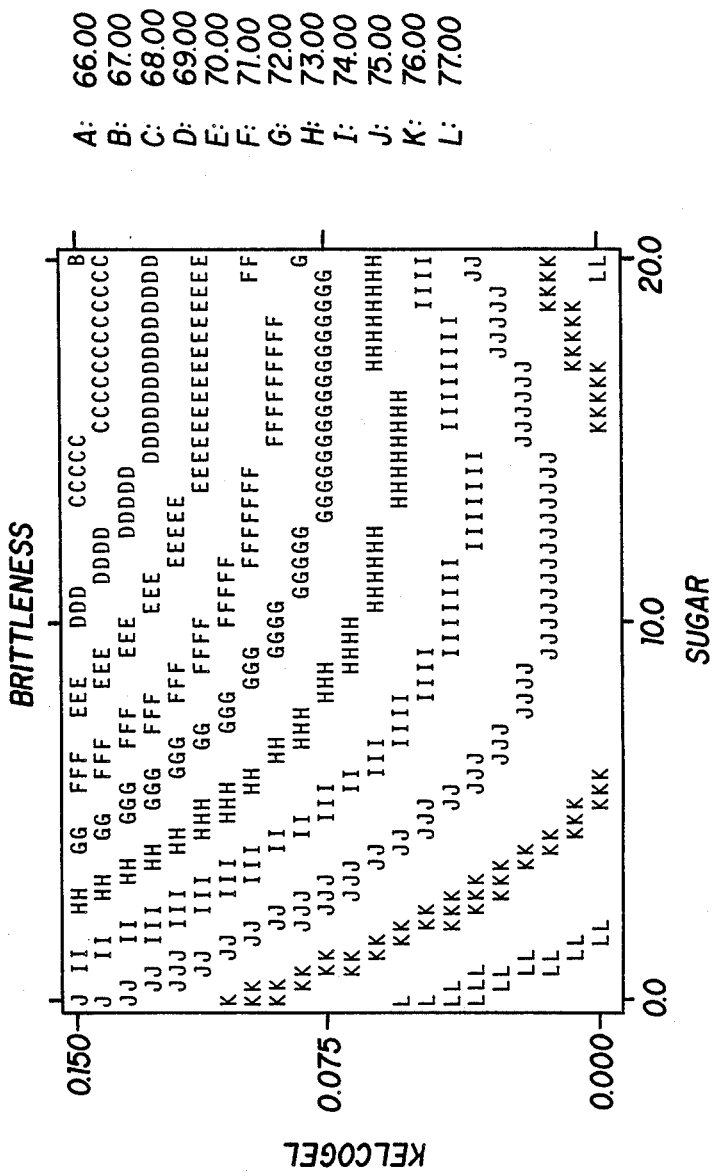
Figure 15:
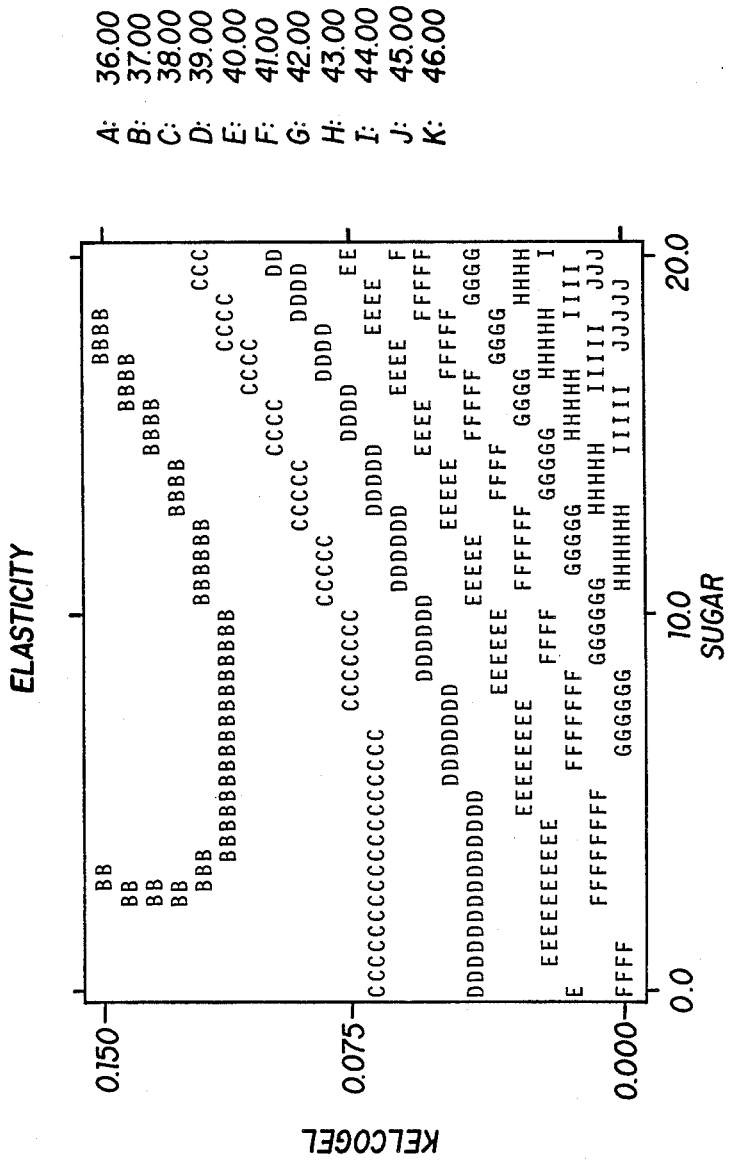
Figure 16:
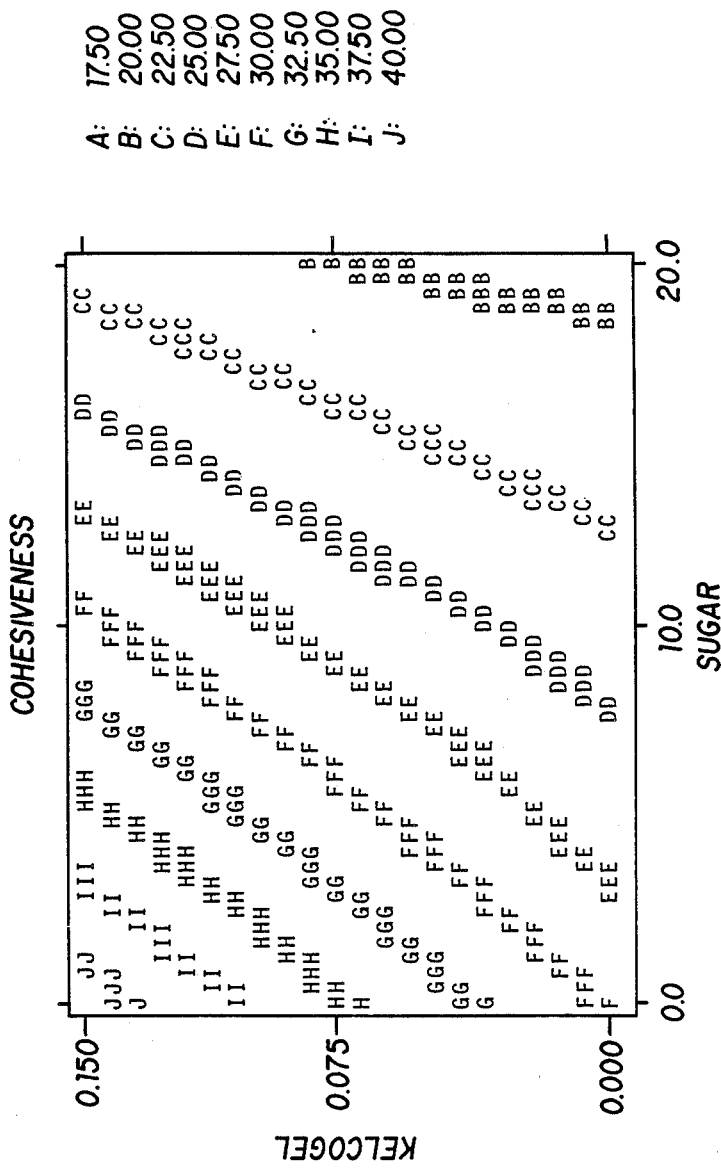

An embodiment of this invention is a dry blend consisting of gellan gum and gelatin in the with ratios 1:20 to 1:50.

Another embodiment of this invention is a dry-mix composition comprising by weight 48.94 to 71.30% of the above blend, 0.0 to 15.44% mono- or divalent cations or combinations thereof, and 28.70 to 35.62% sequestrant.

Another embodiment is a dry-mix composition comprising by weight 33.433 to 62.106% of the above gellan gum-gelatin blend, 0.401 to 9.784% mono- or divalent cations or combinations thereof, (calcium, magnesium, potassium, and sodium are recommended sufficient to provide ion concentrations in the range 52.0 to 262.0 m molar), 24.336 to 24.995% sequestrant, and 12.498 to 32.448% acid (to achieve a final gel pH of 3.5 to 5.0).

Another embodiment is a dry-mix composition comprising by weight 6.51 to 30.078% of the above gellan gum-gelatin blend, 10.035 to 89.518% sugar, 0.042 to 8.802% mono- or divalent cations or combinations thereof, (calcium, magnesium, potassium, and sodium are recommended sufficient to provide concentrations in the range 52.0 to 262.0 m molar), 2.62 to 21.894% sequestrant and 1.31 to 29.192% acid (to achieve a final gel pH of 3.5 to 5.0).

A further embodiment of this invention is a process for preparing gellan gum-gelatin gels from a dry blend which comprises: (1) preparing a blend of all dry ingredients: gellan gum/gelatin/sugar/ions/acids/sequestrant; (2) adding boiling tap-water with stirring for two to 20 minutes to dissolve said blend; and (3) cooling to form the gel.

A further embodiment of this invention is a process for preparing gellan gum-gelatin gels which comprises: (1) preparing a dry blend of gellan gum/gelatin/sequestrants/ions; (2) adding to tap-water and heating to dissolve said blend by stirring for two to 20 minutes; and (3) cooling to form the gel.

A further embodiment of this invention is a process for preparing gellan gum-gelatin gels which comprises: (1) preparing a dry blend of gellan gum/gelatin/sugar/ions/acid(s)/sequestrant; (2) adding to tap-water and heating to dissolve said blend by stirring for two to 20 minutes; and (3) cooling to form the gel.

A further embodiment of the invention is a process for preparing gellan gum-gelatin gels which comprises: (1) preparing a blend of gellan gum/gelatin; (2) dissolving the blend by heating and mixing in de-ionized water; (3) adding monovalent and/or divalent ions, optionally sugar and an acid or a base to achieve a final gel pH of 3.0 to 9.0; and (4) cooling to form the gel. If tap-water is used in place of de-ionized water, a sequestrant would be included to effect the dissolution of the gelling agents.

A further embodiment of this invention is a gel with a pH of 3.0 to 9.0 consisting of gellan gum and gelatin in the ratios 1:6 to 1:133.

By gellan gum is meant deacylated and partially deacylated gellan gum and the clarified forms thereof such as are taught in U.S. Pat. Nos. 4,326,052 (Kang et al.) and 4,503,084 (Baird et al.), which are incorporated herein by reference. Thus, as defined herein, "gellan gum" excludes the native (i.e., fully acylated) form thereof.

Gelatin is a mixture of water-soluble proteins derived from collagen typically by boiling the skin, tendons, ligaments and/or bones of animals in water.

It will be understood by those skilled in the art that reference herein to gum gels shall mean aqueous single or two-phase systems containing an effective amount of the gum and water, optionally with additional materials such as sugars, fats, hydro colloids, proteins, coloring and flavoring agents, and additional organic or inorganic solvents, including glycols.

Blends of gellan gum and gelatin can be prepared as dry mixtures or by combining aqueous solutions or by adding one of the two to an aqueous solution of the other. The gels are conveniently formed by adding boiling water and mixing for two to 20 minutes to dissolve both the gellan gum and the gelatin particles and then allowing the hot aqueous solution to cool.

The blends of this invention are used in amounts ranging from 0.5% to 4.1% by weight of the total solution, preferably 1.24 to 2.06%.

In many applications, gellan gum/gelatin gels require no refrigeration, a significant advantage over gelatin gels, which do have to be refrigerated.

Gellan gum/gelatin blends can be used to provide a range of useful gelled industrial and food products. Typical gelled food products include fabricated vegetables, fruits, meat and fish, aspics, petfoods, water and milk based desserts, syrups and toppings. These gelled products are generally made by preparing an aqueous composition of the food ingredients and dissolved gellan gum/gelatin blend. Gelation is effected by heating to at least 75° C. for two to 60 minutes and then allowing the composition to cool to room temperature.

Depending on the ratio and use levels of gellan gum and gelatin used, the type and amount of food ingredients used, a useful range of textures can be obtained.

The particular end use will dictate the optimum gel strength, texture, mode of gelation, etc. desired. It is considered within the skill of the art for the practitioner to vary the type and amounts of reagents, as taught herein, to overcome particular problems or achieve desired end products.

Combinations of gellan gum and gelatin can be used to produce gels with specific texture requirements. A number of food products can utilize the versatility of this colloid combination. Dessert gels, other acidified gels, confections and many other gel-based foods can benefit from the textures provided by varying the ingredients as described in Table 1.

TABLE 1

GELLAN GUM/GELATIN GELS
INGREDIENT AND CONDITION RANGES

| INGREDIENT | RANGE |
| --- | --- |
| Gellan Gum | 0.03–0.25% of total solution |
| Gelatin, | 0.18–4.0% of total solution |

TABLE 1-continued

GELLAN GUM/GELATIN GELS
INGREDIENT AND CONDITION RANGES

| | |
|---|---|
| type A or B, 50-300 bloom | |
| Sugar | 0.0-40.0% of total solution |
| Ions - Monovalent | 0.0-250 mM |
| Divalent | 0.0-16.0 mM |
| Sequestrant | 0.50-1.50% of total solution |
| CONDITIONS | RANGE |
| Hydration time | 2-60 minutes |
| Heating time | 2-60 minutes |
| Hydration temperature | 20-100° C. |
| Heating temperature | 75-100° C. |
| pH | 3.0-9.0 |

Gels having a desired profile of characteristics can be obtained by performing a Texture Profile Analysis (TPA). TPA is a texture measurement method which simultaneously measures several gel texture characteristics. An Instron 4201 Universal Testing Instrument measures the texture parameters and transmits the data for analysis to a Hewlett-Packard 86B Computer. The five texture characteristics most relevant to this invention are described below. (See also FIG. 1).

Modulus is the initial slope of the force-deformation curve. It is a measure of how the sample behaves when compressed a small amount, and usually correlates closely with the perceived initial firmness of a gel. The units are force per unit area (newtons per square meter or pounds-force (lb$_f$) per square inch).

Hardness is the maximum force during the first cycle of compression and is most often correlated with rupture strength. Hardness is expressed in units of force (newtons or lb$_f$)

Brittleness defines the point of fracture or cracking and is measured as the percent strain required to break the gel. A gel that fractures very early in the compression cycle is more brittle than one that breaks later, thus, the smaller the brittleness value, the more brittle the gel.

Elasticity indicates how "rubbery" the sample is. It is the ratio of the sample height after the first compression cycle to the original sample height which is expressed as a percentage. If the sample returned fully to its original height, the elasticity would be 100%.

Cohesiveness is a measure of how the sample's internal structure breaks down. A sample with a strong internal structure will have a high cohesiveness value expressed as a percent.

TPA has been described in Bourne, M. C., 1978, Texture Profile Analysis. Food Technology Vol. 32 (7):62.

An improved gelatin dessert gel can be prepared from a dry blend (as per Protocol 1) composed of specified quantities of gellan gum, gelatin, sugar, monovalent and divalent ions, sequestrants and acid(s) (Table 2). The addition of gellan gum to a gelatin gel formulation improves setting, melting, toughening (the phenomenon of a gel developing a higher modulus over time; an aging effect), and room temperature stability. Specific improvements made by the addition of eellan gum to a gelatin gel are described below. Representative formulations of this blend are shown in Table 3, along with a 100% gelatin control a. IMPROVED SETTING When held at 5° C. gellan gum-gelatin gels set in 10 minutes versus the gelatin control which set in 40 minutes. When held at 20° C. gellan gum-gelatin gels set in 15 minutes as compared to the gelatin control which did not set by six hours.

b. IMPROVED MELTING

Gellan gum-gelatin gels did not melt when held for 10 minutes at temperatures greater than 75° C. The gelatin control melted in 2.5 minutes at approximately 51° C.

TABLE 2

GELLAN GUM - GELATIN GELS: DRY BLEND
INGREDIENT AND CONDITION RANGES

| INGREDIENT | RANGE |
|---|---|
| Gellan gum* | 0.04-0.06% of total solution |
| Gelatin* type A or B 150-250 Bloom | 1.20-2.00% of total solution |
| Sugar | 0.0-20.00% of total solution |
| Monovalent ions | 50-250 mM |
| Divalent ions | 2-12 mM |
| Sequestrant | 0.50-1.50% of total solution |
| Tap water | 82% |
| CONDITIONS | RANGE |
| Hydration Time | 2-20 minutes** |
| Hydration Temperature | 75-100° C. |
| pH | 3.5-5.0 |

*Gellan gum to gelatin ratio 1:50 to 1:20.
**Time of hydration depends on size of batch.

TABLE 3

DESSERT GEL DRY-MIX FORMULATIONS

| | Hi Clarity* Gel | | | | | |
|---|---|---|---|---|---|---|
| | GELLAN GUM-GELATIN | | GELLAN-GUM GELATIN | | GELATIN CONTROL | |
| | (%) | (Gr) | (%) | (Gr) | (%) | (Gr) |
| Tap Water | 81.82 | 230.00 | 81.19 | 230.00 | 82.11 | 230.00 |
| Sugar | 15.12 | 42.50 | 15.00 | 42.50 | 15.17 | 42.50 |
| Gelatin, 200 Bloom | 1.42 | 4.00 | 1.45 | 4.10 | 1.66 | 4.65 |
| Potassium Citrate | 0.71 | 2.00 | 1.23 | 3.50 | 0.36 | 1.00 |
| Adipic Acid | 0.57 | 1.60 | 0.74 | 2.10 | 0.64 | 1.80 |
| Citric Acid Monohydrate | 0.18 | 0.50 | 0.17 | 0.50 | 0.00 | 0.00 |
| Calcium Sulfate | 0.08 | 0.22 | 0.11 | 0.28 | 0.00 | 0.00 |
| Flavor | 0.05 | 0.15 | 0.05 | 0.15 | 0.05 | 0.15 |
| Gellan Gum | 0.05 | 0.15 | 0.05 | 0.15 | 0.00 | 0.00 |
| Total | 100.00 | 281.12 | 100.00 | 281.12 | 100.00 | 280.10 |

*>85% transmittance at 490 nm.

c. IMPROVED DEVELOPMENT OF SETTING STRENGTH

The addition of gellan gum to a gelatin gel improves setting strength. After one-half hour of refrigeration at 5° C., the modulus value of the gellan gum-gelatin gel had increased to 0.56 N/m$^2$ which was three times that of the gelatin control at 0.18 N/m$^2$.

d. REDUCED EFFECTS OF AGING

Gellan gum in combination with gelatin tempers the toughening effect of time on gelatin gels. During a 10-day period when gels were held at 5° C., the gellan gum-gelatin gel decreased in firmness by 12% whereas the gelatin gel increased by 9%.

e. IMPROVED ROOM TEMPERATURE STABILITY

Gellan gum imparts a slight increase in stability to gelatin gels which are set out at room temperature after having been fully set under refrigeration. During the first six hours, the amount of decline in modulus and hardness is less in the gellan gum-gelatin gel than in the gelatin control.

Thus, a gellan gum-gelatin gel has the following advantages over a typical commercial gelatin gel:
a. faster setting time
b. room temperature setting
c. slower melting time
d. faster development of full-strength set
e. reduced toughening effects of aging
f. improved room temperature stability after refrigerated set.

A variety of gel textures can be produced (as per Protocol 2) by combining specified quantities of gellan gum, gelatin, sugar, monovalent and divalent ions, and acid (Table 2).

Because of the varying effects that are produced by changing the relative and absolute values of gellan gum, gelatin, sugars, ion concentrations and pH, a trial-and-error approach to preparing a desired profile can be tedious. A computerized mathematical tool can be utilized to facilitate this task. A well known mathematical equation which calculates the interactions between these variables is the Taylor Second Order Expansion. A computer program that calculates the Taylor equation is recommended. Such a program is Response Surface Methodology (RSM) (Foremost-McKesson Research & Development Center, 6363 Clark Ave., Dublin, Calif.).

The following general guidelines can be used to assist in determining which factors can be varied to achieve a desired effect.

Effects of Individual Factors

Gelatin positively influences modulus, hardness, brittleness, and elasticity. Therefore, addition of gelatin to a system will increase these characteristics. Gelatin does not appear to affect cohesiveness.

Gellan gum has a positive effect on modulus and a negative effect on brittleness. As more gellan gum is added to the system, modulus increases, while the gel becomes more brittle. Gellan gum does not appear to have an influence on hardness, elasticity or cohesiveness.

Hardness is positively influenced by pH. The higher the pH (up to 7.0), the harder the gel. pH also positively influences modulus, brittleness and elasticity, but not as strongly as hardness. Cohesiveness is negatively affected by pH; i.e., maximum cohesiveness is obtained at the minimum pH level.

Sugar positively influences hardness and elasticity and, to a lesser extent, brittleness. It negatively affects the cohesiveness of a gel.

Potassium ions positively affect hardness and, to a lesser extent, elasticity. They have a strong negative influence on cohesiveness and a slight negative effect on modulus. Brittleness does not appear to be affected by potassium level.

Effects of Factor Interactions

As a specific example of the results obtained using TPA analysis, a gel was prepared with 1.8% gelatin (type A/200 Bloom), 0.04% gellan gum, pH 4.1, 15% sugar and 65 mM potassium. Gelatin and ellan gum levels were then varied. The predicted results as determined by RSM are summarized as follows:
(1) Modulus is increased by raising levels of gellan gum and gelatin both separately and together. When gellan gum and gelatin are added together, there appears to be a stronger effect on modulus then when either one is added alone
(2) Hardness is most strongly affected by gelatin level. Gellan gum appears to have a small effect on hardness. As gellan gum level is increased (to 0.06%), more gelatin is required to maintain a given level of hardness.
(3) Increase gelatin level reduces the brittleness of a gel, but the predominant influence is by gellan gum. Gellan gum has a strong tendency to increase the brittleness of the gel. Therefore, the higher the gellan gum, the more brittle the gel.
(4) Increasing the level of gellan gum decreases the elasticity, whereas increasing gelatin increases elasticity. The higher the level of gelatin in a system, the lower the level of gellan gum is needed to decrease elasticity. Therefore, at higher levels, gellan gum and gelatin appear to have an antagonistic effect on elasticity.
(5) Cohesiveness is improved by two conditions: high gellan gum combined with low gelatin levels, and high gelatin levels combined with low gellan gum levels. This appears to be another antagonistic relationship.

To evaluate the effects of potassium in this system, gelatin was set at 1.8%, pH at 4.1, and sugar was 15%. Observations for each predicted response follow:
(1) The lowest modulus (0.80) values were generated at potassium levels from 20 mM to 140 mM and gellan gum less than 0.075%.
(2) Elasticity optima are approximated with potassium levels of less than 50 mM but greater than 90 mM, and gellan gum values of 0 to 0.07%.
(3) The higher the potassium value, the lower the cohesiveness. A value of 12% is achieved at 0 mM potassium. At less than 80 mM potassium, gellan gum appears to have no effect on cohesiveness.

The sugar/pH relationship can be analyzed by varying the two factors while holding gelatin at 1.8%, gellan gum at 0.04%, and potassium at 65 mM.

pH Effects

1. The lowest modulus is reached with the extremes, pH 3 and 7. A pH of 5 yields the highest modulus.
2. The lower the pH, the softer the gel. Sugar has the stronger influence over hardness.
3. Generally, the lower the pH, the less brittle the gel at all sugar levels.
  At pH 4.1, the brittleness is approximately 70% for sugar levels of 2 and 15%. The most brittle gels are produced at pH 6-7 with less than 10% sugar.
4. Gels are more elastic at lower levels of sugar when the pH is at the extremes of 3 and 7. At pH 5, more sugar is required in the system to maintain elasticity.
5. The least cohesive gels are found between pH 5 and 7. Sugar does not appear to affect cohesiveness in this system.

Low pH improves modulus, elasticity, and cohesiveness, while adversely affecting hardness and brittleness. At the pH of 4.1, hardness and cohesiveness can be improved by altering the sugar level.

15% Sugar

1. At 15% sugar and pH 4.1, modulus is 1.0 N/m$^2$. To reach a value of 0.30 N/m$^2$, pH would have to be dropped below 3.0. A change in sugar level does not make a difference in modulus value.

2. Hardness values are above 7.0 lb$_f$. To decrease hardness, pH would have to be dropped.
3. At 15% sugar and pH 4.1, brittleness is about 70%. To improve the brittleness value, the pH would have to be dropped to 3.0.
4. Elasticity values can be raised by decreasing pH.
5. Cohesiveness values can also be raised by decreasing pH.

2% Sugar

1. The modulus is 1.0 N/m$^2$ at pH 4.1 and 2% sugar; i.e., not different than at 15% sugar.
2. The change from 15% to 2% sugar causes a drop in hardness from 6.0 to 4.5 lb$_f$. Sugar concentration is the dominant factor here. At 2% sugar, hardness could be increased by raising pH to approximately 6.5.
3. The lower sugar level appears to make the gel less brittle at low pH. At low sugar levels, low brittleness is achieved over a wider pH range (3.0–3.5) than at higher levels of sugar.
4. Elasticity is compromised when the sugar level is lowered. To improve elasticity, pH would have to be less than 3.0 or greater than 7.0 or sugar level increased.
5. Cohesiveness is improved by lowering the sugar level. A cohesiveness level of 12% can be reached by lowering the pH to approximately 3.5.

Such a "sugar-free" system creates a softer, less elastic, less brittle, and more cohesive gel than the 15% sugar gel. The modulus is not changed by sugar content, but is strongly affected by pH.

Based on these analyses, the following conclusions can be drawn:

1. The texture characteristics of a gel prepared with gelatin, gellan gum, sugar, potassium, and acids and bases (pH) are uniquely affected by each ingredient. Overall, gelatin has the most impact on gel texture as it enhances modulus, hardness, brittleness and elasticity as its level is increased. Addition of gellan gum improves the firmness (modulus) of a gel while increasing its brittleness. The effect of gellan gum on modulus and brittleness is stronger than that of gelatin. There is a slight synergistic effect between gellan gum and gelatin on modulus, whereas brittleness is the result of an antagonistic interaction in which gellan gum dominates.
2. pH appears to strongly affect hardness. The higher the pH, the harder the gel. pH impacts the other texture parameters to a lesser degree. Modulus and cohesiveness are increased at lower pH levels (3.0); at higher pH levels (7.0) gels become more elastic and less brittle.
3. Sugar exhibits strong influence over three texture parameters. Increased sugar concentrations improve hardness and elasticity, while reducing cohesiveness.
4. To a lesser extent, the addition of sugar makes a gel less brittle.
5. Higher levels of potassium produced harder, but less cohesive gels. Potassium addition mildly enhances modulus and elasticity values, but appears to have little impact on brittleness.

The invention is further defined by reference to the following examples, which are intended to be illustrative and not limiting.

Unless otherwise indicated, temperatures are in degrees Celsius.

PROTOCOL 1

All dry ingredients (see Table 3 and Example 1) were blended together and poured into 500 ml glass beakers. Tap water was heated to boiling, measured and added to the dry ingredients. The solutions were stirred with a rubber spatula until the gelatin was dissolved (approximately 2 minutes).

EXAMPLE 1

One-Step Dessert Gel

Gels were prepared according to Table 3 and Protocol 1 and evaluated. The following results were obtained:

pH

Gels ranged in pH from 4.5 to 4.8. Gel clarity improved at higher pH levels.

Setting

In all cases, the gellan gum/gelatin gel showed significantly improved setting versus the gelatin control.

Melting

Gels containing gellan gum were significantly more stable at higher temperatures (above 50° C.) than the gelatin control. The gellan gum gels had a mean maximum temperature of 79° C. and none melted after being heated for 10 minutes. The gelatin gel melted within three minutes at an average temperature of 45° C.

Setting Strength

Gellan gum-gelatin gels developed modulus values that were three times that of the gelatin control within one hour and then stabilized after 17 hours.

Toughening

Over a ten-day period the gellan gum gels decreased in firmness (modulus) while increasing in hardness. This behavior was opposite that observed for the gelatin control.

Room Temperature Stability

During the six-hour period in which gels were set out at room temperature the gellan gum/gelatin gels broke down at a much slower rate than the gelatin control.

Water Hardness Tolerance

The gel formulations did not appear to be affected by changes in water hardness from 50 to 350 ppm calcium carbonate as evidenced by TPA and clarity data.

Clarity

High-clarity gellan gum-gelatin gel had a clarity of 5.6% transmittance at 490 nM. The regular gellan-gum gelatin gel measured 72.00% transmittance and the elatin control measured 91.00% transmittance.

PROTOCOL 2

Gels presented in the examples 2–4 were prepared and evaluated as follows:

MATERIALS

1. KELCOGEL clarified, deacylated gellan gum
2. Gelatin (Atlantic type A/200 Bloom)
3. Sugar (granulated)
4. Gelling Ions (KCl, CaCl$_2$"2H$_2$O)

5. pH (adjusted with 0.1 N HCl or 0.1 N NaOH)
6. Water (deionized tap-water)

METHODS

1. Designated quantities of gellan gum, gelatin, and sugar were dry blended.
2. 225 grams of deionized tap-water was added to a tared hot-cup.
3. The dry mix was added to the water under shear. The cold solution was mixed for 15 minutes.
4. The mixture was heated to 75° C. for 15 minutes under shear.
5. Towards the end of the heating time, the designated amount of ions was added and the pH was adjusted as required.
6. The hot-cup was re-weighed and hot water was added to bring the total solution weight to 301 grams.
7. The solution was mixed for 30 seconds and then poured into well-greased molds (six replicates of each gel were made).
8. The molds were held at room temperature for 30 minutes and then refrigerated at 4° C. for 22 to 26 hours.

EXAMPLE 2

Preparation and Evaluation of a Firm, Elastic Gel

A very firm and highly elastic gel was prepared by combining 3.85% gelatin, 0.075% gellan gum, 10% sugar, and 75 mM potassium at pH 5.0. This combination resulted in a gel with a modulus of 2.7 N/m$^2$, hardness of 37.14 lb$_f$, brittleness of 78.6%, elasticity of 78.88%, and cohesiveness of 16.18%.

By holding three of the ingredients constant (10% sugar, 75 mM potassium, and pH 5) while varying the amounts of gellan gum from 0 to 0.15% and gelatin from 1.3 to 3.0%, each texture parameter can be changed significantly with incremental changes in gelatin and gellan gum levels. RSM predictive models indicate that the following texture ranges are achievable.

Modulus values of 1.2 to 2.6 N/m$^2$, hardness values of 4.0 to 20.0 lb$_f$, values of 56 to 72% brittleness, 24 to 60% elasticity, and 5.25 to 11.25% cohesiveness are attainable. (See FIGS. 2–6.)

EXAMPLE 3

Preparation and Evaluation of a Hard, Non-Brittle Gel 3.0% Gelatin was combined with 0.15% gellan gum, 20% sugar, and 150 mM potassium at pH 7.0 to produce a very hard gel with a high brittleness value (a less brittle gel). This gel had a modulus of 2.0 N/m$^2$, hardness of 30.33 lb$_f$, brittleness of 79.82%, elasticity of 78.60%, and cohesiveness of 18.04%.

When three ingredients (3.0% gelatin, 0.15% gellan gum, and 20% sugar) are held constant varying pH from 3.0 to 7.0 and potassium from 0 to 150 mM RSM models predict gels with modulus values of 2.0 to 2.8 N/m$^2$, hardness values of 16 to 30 lb$_f$, and values of 64 to 78% brittleness, 35 to 75% elasticity, and 6 to 18% cohesiveness. (See FIGS. 7–11.)

EXAMPLE 4

Preparation and Evaluation of a Weak But Highly Elastic and Cohesive Gel 1.3% Gelatin was mixed with 0.15% gellan gum, no sugar, and no ions at pH 3.0. The resulting gel was very weak, but highly cohesive and elastic. The gel had a 0.16 N/m$^2$ modulus value, 0.75 lb$_f$ hardness value, 79.15% brittleness, 38.85% elasticity, and 43.40% cohesiveness values.

When sugar and gellan gum levels are varied from 0 to 20% and 0 to 0.15%, respectively, and gelatin, potassium, and pH are held constant at the above values, a range of gel textures is achieved, as from 0 to 0.45 N/m$^2$, hardness ranges from 0.8 to 4.0 lb$_f$, brittleness from 67 to 77%, elasticity from 37 to 45%, and cohesiveness from 20 to 40%.

PROTOCOL 3

Gellan gum-gelatin gels and gelatin control gels (Examples 5–10) were prepared and evaluated as follows:

| | MATERIALS | USE LEVEL |
|---|---|---|
| 1. | Gellan gum (clarified) | 0.05% |
| 2. | Gelatin (Atlantic Type A/200 Bloom) | 1.65% |
| 3. | Sugar (granulated) | 15.00% |
| 4. | Gelling Ions: | |
| | KCl | 37 mM |
| | CaCl$_2$"2H$_2$O | 8.4 mM |
| 5. | pH (adjusted with 0.5 N HCl) | 4.1 |
| 6. | Water (deionized tap-water) | to 100% |

METHODS

1. Designated quantities of gellan gum, gelatin, and sugar were dry-blended.
2. 225 grams of deionized tap-water was added to a tared hot-cup.
3. The dry mix was added to the water under shear. The cold solution was mixed for 15 minutes.
4. The mixture was heated to 75° C. for 15 minutes under shear.
5. Towards the end of heating time, the designated amount of ions was added and the pH was adjusted as required.
6. The hot-cup was reweighed and hot water was added to bring the total solution weight to 301 grams. The solution was mixed for 30 seconds.

JELL-O Strawberry Gelatin Dessert (General Food Corp.) (approximately 1.20 to 1.75% gelatin) was used as the commercial control in all examples. It was prepared as per package directions.

EXAMPLE 5

Fast Setting Refrigerated Gelatin Dessert Gel

Gel solutions were poured in 16×150 mm glass test tubes with extended adhesive tape rims. Gels extended approximately ½ inch above the glass rim of the test tube. The filled test tubes were placed in a refrigerator at a specified constant temperature (0° C. to 10° C.). At time intervals from 30 minutes to eight hours after pouring, the gels were evaluated for setting by removing the tape rim and slicing off the upper portion of the gel. Three lead shots (from a Bloom Gelometer) were dropped on the surface from a distance of six inches. A gel was determined to be set when the dropped shot did not penetrate the gel surface.

The gellan-gum gelatin gel had an initial internal temperature of 63.2° C. whereas JELL-O was initially 42.4° C. due to differences in preparation methods. The gellan gum-gelatin gel set in 30 minutes at 0° C. and 5° C. and in 40 minutes at 10° C. JELL-O set in 40 minutes at 0° C. and 5° C. and in 50 minutes at 10° C.

EXAMPLE 6

Non-Refrigerated Gelatin Dessert Gel

A dessert gel which set without refrigeration was prepared as described in example 4. The gellan gum-gelatin gel set in one hour at 15° C. as compared to 1½ hours for JELL-O. At 20° C. and above, the JELL-O gels had not set by eight hours whereas the gellan gum-gelatin gels set in three hours at 20° C. and six hours at 23° C. At 30° C., neither gel had set by eight hours.

EXAMPLE 7

Slow Melting Refrigerated Gelatin Dessert Gel

Twenty ml of the gel solutions were poured into 50 ml beakers, covered with plastic wrap and refrigerated at 5° C. After 24 hours, the chilled gels were placed in a beaker containing 60 ml of cold tap-water. Three lead shots (from the Bloom Gelometer) were placed on the gel surface approximately one-fourth inch apart. The double-beaker set-up was placed on a hot plate set at 200° C. The time and temperature at which two of three lead shots penetrated the gel surface was determined to be the melting point.

The JELL-O gel took three minutes to melt at an average melting temperature of 42° C. The gellan gum-gelatin gel took 6½ minutes to melt at an average temperature of 40° C. The large difference in melting time indicates that the addition of gellan gum to a gelatin gel does benefit gel stability under moderate temperature conditions.

EXAMPLE 8

Gelatin Dessert Gel with Improved Setting Strength

Gel solutions were poured into well-greased ring molds (acrylic, one half inch high rings with plastic top and bottom covers) and immediately placed in the refrigerator at 5° C. At intervals of 1, 2, 4, 6, 17, 24, 48 and 72 hours, the gels were removed from the refrigerator and evaluated for strength of set by TPA.

Of the five TPA characteristics measured, modulus is the most indicative of gel setting strength. At one hour the gellan gum-gelatin gel had developed a modulus of 0.32N/m² whereas the gelatin control and JELL-O had only developed to 0.18 and 0.14N/m², respectively.

Over the 72 hour period the gellan gum-gelatin gel, gelatin gel, and JELL-O increased in firmness by 44%, 83% and 93%, respectively. The gellan gum-gelatin gel demonstrates a higher initial firmness with a smaller residual strength development over time than the gelatin control or JELL-O.

EXAMPLE 9

A Gelatin Dessert Gel that Exhibits Reduced Toughening on Aging

Gel solutions were poured into well-greased ring molds, left at room temperature for 30 minutes and then refrigerated at 2° C. for 24 hours. TPA's were taken to evaluate texture changes over time at 24 and 72 hours, 7, 14 and 21 days.

Using change in modulus as the quantifying factor, the gellan gum-gelatin gel held at 2° C. decreased in toughness over time by a change in modulus of 10%, while the JELL-O gelatin dessert control increased 9%.

EXAMPLE 10

A Gelatin Dessert Gel with Improved Room Temperature Stability

Gel solutions were poured into well-greased ring molds, left at room temperature for 30 minutes and then refrigerated at 2° C. After 24 hours all els were removed from the refrigerator and placed on the counter. Gels were removed from the ring molds and left to stand on the bottom plate. TPA's were taken immediately after removal from the mold and at 1, 2, 6, 8, 24, and 48 hours to determine gel stability at room temperature.

Firmness declined dramatically in both gels in the first hour, increased slightly between two and eight hours, remained steady through 24 hours and returned to approximately the initial firmness value to 48 hours. Hardness followed approximately the same pattern, except final hardness was much higher than initial.

The amount of decline in modulus and hardness was less in the gellan gum-gelatin gels than the JELL-O gel for the first six hours. The decrease in modulus was 37% in the gellan gum-gelatin gel versus 42% for JELL-O. Hardness decreased 58% in the gellan gum-gelatin gel versus 64% for JELL-O. The gellan gum imparted a slight protective effect to the stability of the gelatin gel.

What is claimed is:

1. A blend of gellan gum and gelatin in the with ratios of 1:20 to 1:50.

2. A dry-mix composition comprising by weight 48.94 to 71.30% of the blend of claim 1, 0.0 to 15.44% mono- or divalent cations or combinations thereof, and 28.70 to 35.62% sequestrants.

3. A dry-mix composition comprising by weight 33.433 to 62.106% of the blend of claim 1, 0.401 to 9.784% mono- or divalent cations or combinations thereof, 24.336 to 24.995% sequestrants, and 12.498 to 32.448% acid.

4. A dry-mix composition comprising by weight 6.51 to 30.078% of the blend of claim 1, 10.035 to 89.518% sugar, 0.042 to 8.802% mono- or divalent cations or combinations thereof, 2.62 to 21.894% sequestrants, and 1.31 to 29.192% acid.

5. A process for preparing gellan gum/gelatin gels from a dry blend which comprises: (1) preparing a blend of (a) 6.51 to 30.07% of a 1:20 to 1:50 blend of gellan gum and gelatin, (b) 10.035 to 89.518% sugar, (c) 0.042 to 8.802% mono- or divalent cations or combinations thereof, (d) 2.62 to 21.894% sequestrants, and (e) 1.31 to 29.192% acid, all by weight; (2) adding boiling tap-water thereto and dissolving said blend by stirring for two to 20 minutes; and (3) cooling to form the gel.

6. A process for preparing gellan gum-gelatin gels which comprises: (1) preparing a dry blend of (a) 48.94 to 71.30% of a 1:20 to 1:50 blend of gellan gum and gelatin, (b) 0.0 to 15.44% mono- or divalent cations or combinations thereof, and (c) 28.70 to 35.62% sequestrants, all by weight; (2) adding to tap water and heating to dissolve said blend by stirring for two to 20 minutes; and (3) cooling to form the gel.

7. A process for preparing gellan gum/gelatin gels which comprises: (1) preparing a dry blend of (a) 6.51 to 30.078% of a 1:20 to 1:50 blend of gellan gum and gelatin, (b) 10.035 to 89.518% sugar, (c) 0.042 to 8.802% mono- or divalent cations or combinations thereof, (d) 2.62 to 21.894% sequestrants, and (e) 1.31 to 29.192% acid, all by weight; (2) adding to tap-water nd heating to dissolve said blend by stirring for two to 20 minutes; and (3) cooling to form the gel.

* * * * *